United States Patent
Shimizu et al.

(10) Patent No.: US 12,392,712 B2
(45) Date of Patent: Aug. 19, 2025

(54) INFRARED CIRCULAR DICHROISM MEASUREMENT APPARATUS

(71) Applicant: JASCO CORPORATION, Tokyo (JP)

(72) Inventors: Masaru Shimizu, Tokyo (JP); Jun Koshobu, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 266 days.

(21) Appl. No.: 18/028,962

(22) PCT Filed: Sep. 28, 2020

(86) PCT No.: PCT/JP2020/036715
§ 371 (c)(1),
(2) Date: Mar. 28, 2023

(87) PCT Pub. No.: WO2022/064714
PCT Pub. Date: Mar. 31, 2022

(65) Prior Publication Data
US 2023/0333006 A1   Oct. 19, 2023

(51) Int. Cl.
*G01N 21/19* (2006.01)
*G01N 21/35* (2014.01)

(52) U.S. Cl.
CPC .......... *G01N 21/19* (2013.01); *G01N 21/35* (2013.01); *G01N 2201/06113* (2013.01); *G01N 2201/0683* (2013.01)

(58) Field of Classification Search
CPC .......... G01N 21/19; G01N 21/35; G01N 2201/06113; G01N 2201/0683; G01N 21/39; G01N 2021/216
See application file for complete search history.

(56) References Cited

U.S. PATENT DOCUMENTS 6,118,536 A * 9/2000 Sakamoto .............. G01N 21/19
356/364
2012/0122084 A1   5/2012 Wagner et al.
(Continued)

FOREIGN PATENT DOCUMENTS

CN    108663456    10/2018
JP    11-51855      2/1999
(Continued)

OTHER PUBLICATIONS

Ruther et al., "pH Titration Monitored by Quantum Cascade Laser-Based Vibrational Circular Dichroism," The Journal of Physical Chemistry B, Mar. 21, 2014, vol. 118, pp. 3941-3949.
(Continued)

*Primary Examiner* — Kiho Kim
(74) *Attorney, Agent, or Firm* — Greenblum & Bernstein, P.L.C.

(57) ABSTRACT

A circular dichroism measurement apparatus includes a laser light source (QCL) capable of sweeping a wavenumber of a laser light in an infrared wavenumber range containing at least one peak of the sample; a sample chamber where the sample is disposed; a photoelastic modulator that modulates a polarization state of the laser light before or after the laser light of a specific wavenumber in a wavenumber sweep transmits the sample; a detector that detects a variation in intensity of the laser light which transmitted the sample and of which its polarization state is modulated; and a signal processing device that extracts an alternating-current component (AC) that synchronize with a modulation frequency and a direct-current component (DC) from a detected signal of the detector, and calculates a value of infrared circular dichroism of the sample based on a ratio (AC/DC) of the AC and DC.

7 Claims, 19 Drawing Sheets

(56) References Cited

U.S. PATENT DOCUMENTS

2013/0258334 A1* 10/2013 Sunami .............. G01N 21/19
356/327
2018/0059005 A1  3/2018 Marshall et al.
2022/0155218 A1  5/2022 Miyoshi et al.

FOREIGN PATENT DOCUMENTS

| JP | 2012-202812 | 10/2012 |
| JP | 2013-205275 | 10/2013 |
| JP | 2014-503195 | 2/2014 |
| WO | 2020/188841 | 9/2020 |

OTHER PUBLICATIONS

Office Action issued in Corresponding JP Patent Application No. 2022-519562, dated Jun. 9, 2022, along with an English translation thereof.

International Search Report issued in International Patent Application No. PCT/JP2020/036715, dated Dec. 1, 2020, along with an English translation thereof.

Extended European Search Report Issued in Corresponding EP Patent Application No. 20955307.2, dated May 29, 2024.

Pfeifer, Marcel et al., "MID-IR laser-based Vibrational Optical Activity," Proc. Of SPIE vol. 8219, Jan. 2012, pp. 1-7.

* cited by examiner

Wavenumber sweep range : 1750 - 1500 cm⁻¹
Output : about 300 mW
Output stability : within ±1%
Wavenumber resolution : about 0.2 cm⁻¹ or less FIG.15
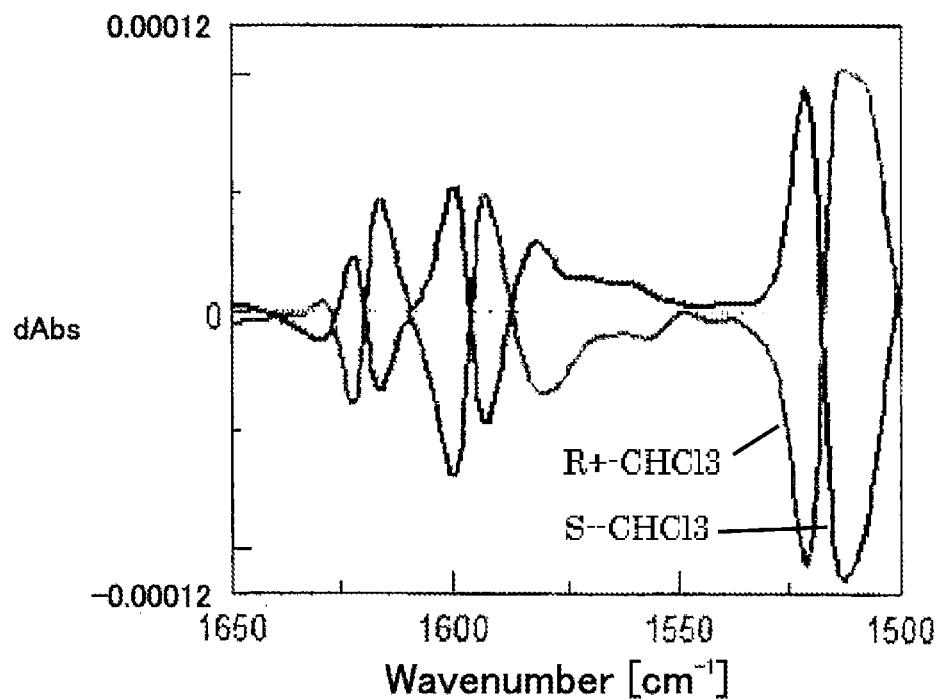
FIG.16  Apparatus can measure CD spectra of sample of which ab sorbance is 4 (4 Abs) at a resolution of 0.0001 ΔAbs !!!
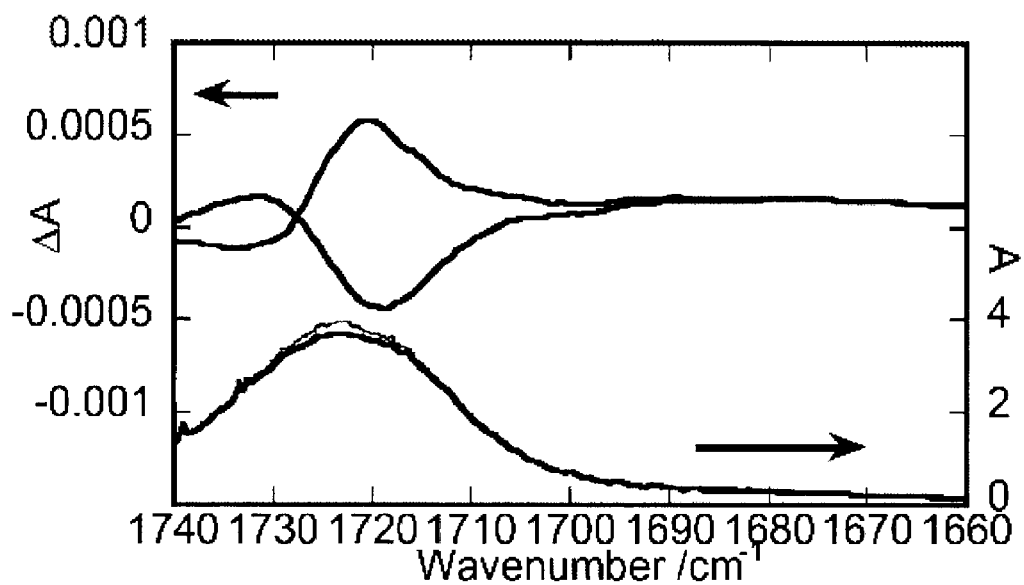

FIG. 17A MCT with 1 mm diameter elements
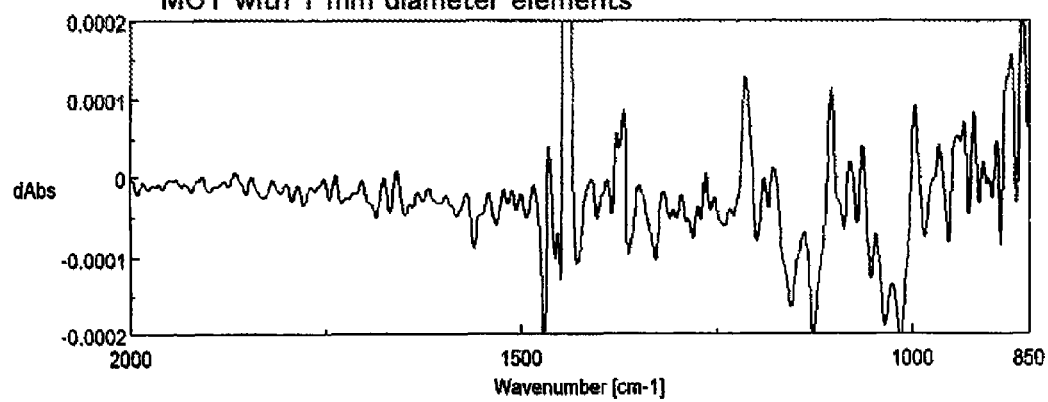
FIG. 17B MCT with 0.2 mm diameter elements
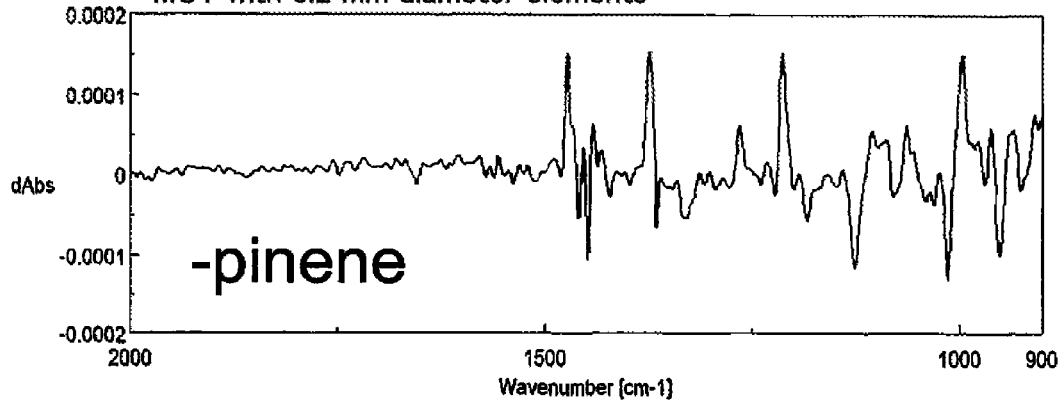

Duty 83%

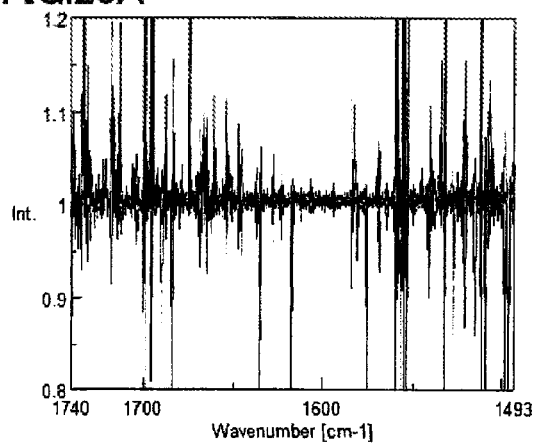
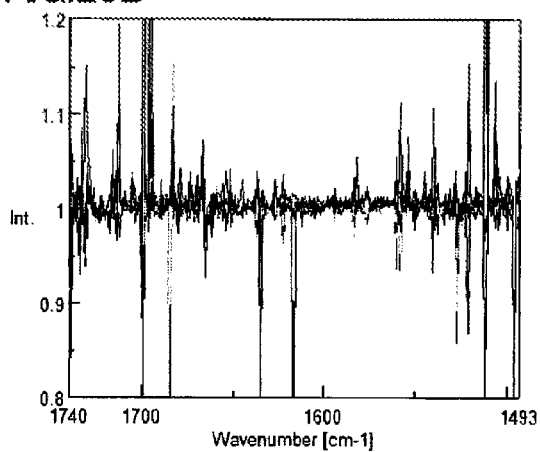
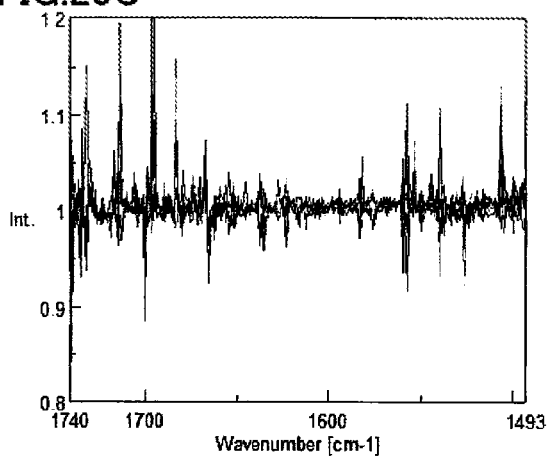

INFRARED CIRCULAR DICHROISM MEASUREMENT APPARATUS

TECHNICAL FIELD

The present invention relates to a measurement apparatus of infrared CD (so-called vibrational circular dichroism).

BACKGROUND ART

Apparatuses for measuring vibrational circular dichroism related to vibrational transition have been applied in structural analysis of medicines or physiologically active substances since a good comparability between spectra acquired by measurement and spectra calculated from molecular structures.

Patent Literature 1 discloses a method of measuring vibrational circular dichroism using a Fourier transform CD spectrometer. In Fourier transform types (FT type), an infrared interference wave generated by an interferometer which can vary an optical light path difference, not by a diffraction grating, is used as a measurement light. An example of a configuration of the FT type CD spectrometer is in the order of: an infrared light source; an interferometer; a photoelastic modulator (PEM); a cell portion (sample); an MCT detector; a signal processing portion (e.g., lock-in amplifier); and a Fourier transformation portion (e.g., computer).

The infrared interference wave becomes an interference wave constituted of right-handed and left-handed circularly polarized lights that are alternately generated by the PEM, irradiates a sample, and are detected by the MCT detector. In a detected signal (also called as an interferogram) of the infrared interference wave, a difference ($\Delta A$) in absorbances of the right-handed and left-handed circularly polarized lights appears as a periodic variation of the detected signal. That is, since the detected signal of the interference wave contains an alternating-current component (AC) that synchronize with polarization modulation of the PEM and a direct-current component (DC), they are extracted with a lock-in amplifier to calculate a ratio (AC/DC) of the AC and the DC. However, since the detected signal is a signal of the interference wave, an infrared CD spectrum is acquired by Fourier transformation on a computer in the last step.

CITATION LIST

Patent Literature

Patent Literature 1: Japanese Unexamined Patent Publication No. 2013-205275 A

SUMMARY Of INVENTION

Technical Problem

When the difference ($\Delta A$) in absorbance is to be measured, a better measurement precision can be achieved in theory by measuring a sample in which an absorbance A is as high as possible. However, the higher the absorbance A of the sample, the lower the amount of the detected light and the weaker the detection signal; therefore, influence of noise increases, and the difference in absorbance cannot be measured.

In the Fourier transform CD spectrometer of Patent Literature 1, there is a limitation such that the absorbance A of the sample is set between 1.5 to 2 at highest, and usually around 1. Here, the absorbance A is defined as the following equation.

$$A = \varepsilon cL = -\log_{10}(I/I_0) \quad (1)$$

In the equation, L represents the optical path length, c represents a molar concentration, $\varepsilon$ represents a molar absorption coefficient, $I_0$ represents intensity of an incident light, and I represents intensity of an outgoing light. In a case of a solution sample, for example, the molar concentration c or the optical path length L of the cell is varied to adjust the absorbance A of the sample to 1.5 to less than 2 at highest. On the other hand, in a case of measuring a sample such as protein having water as a solvent, the absorbance tends to exceed 2, and it is difficult to acquire an infrared CD signal.

When the sample has an absorbance of 2 or greater (e.g., within a range of 2 to 5), the measurement condition becomes unfavorable because the amount of light cannot be detected sufficiently with conventional measurement apparatuses. The object of the present invention is to provide an infrared circular dichroism measurement apparatus capable of measuring an infrared CD with a suitable signal-to-noise ratio of such sample.

Solution to Problem

The inventors focused on a quantum cascade laser (QCL) having a high luminance, a high output and a broadband wavenumber variable function while being an infrared laser, proceeded on a study of applying the QCL to an infrared CD measurement as a measurement light, and thus completed the present invention.

That is, an infrared circular dichroism measurement apparatus according to the present invention comprises:
a laser light source capable of sweeping a wavenumber of a laser light in an infrared wavenumber range containing at least one absorption peak of a sample;
a sample chamber where the sample is disposed;
a polarization modulator that modulates a polarization state of the laser light which has a specific wavenumber in a wavenumber sweep, either before or after the laser light transmits the sample;
a detector that detects a variation in intensity of the laser light which has transmitted the sample and of which its polarization state is modulated; and
a signal processing device that extracts an alternating-current component (AC) that synchronizes with a modulation frequency and a direct-current component (DC) from a detected signal of the detector, and calculates a value of infrared circular dichroism of the sample based on a ratio (AC/DC) of the AC and the DC.

Here, the laser light source is preferably a quantum cascade laser (QCL). Moreover, an average output of when the laser light is emitted from the laser light source in a continuous mode at full power is preferably 1 mW or greater, and an oscillation linewidth of the laser light is preferably within a range of 0.05 to 4.0 $cm^{-1}$.

Moreover, the signal processing device preferably calculates the value of infrared circular dichroism for each specific wavenumber in a wavenumber sweep to acquire an infrared circular dichroism spectrum of the sample.

Furthermore, a gain switching optical element disposed at any position on an optical path of the laser light, and a switching device that switches the gain switching optical element depending on a swept wavenumber of the laser light to adjust an amount of light entering the detector are preferably comprised.

Moreover, the signal processing device preferably comprises a gain switching electric element that electrically switches intensity of an analogue signal depending on the swept wavenumber of the laser light to reduce a quantization error upon analog-to-digital conversion.

Furthermore, a chopper disposed at any position on the optical path of the laser light is preferably comprised, and a passing rate of the laser light at the chopper is preferably 70% or greater.

Moreover, the signal processing device preferably has:
a memory portion that stores an absorption peak wavenumber of water or water vapor;
a determination portion that determines whether the swept wavenumber of the laser light matches with the absorption peak wavenumber of water or water vapor; and
an avoidance portion that executes a processing of avoiding influence of the absorption peak when the wavenumbers match;
wherein
the avoidance portion is preferably configured to calculate the infrared circular dichroism value in the absorption peak wavenumber of water or water vapor based on the infrared circular dichroism value by the laser light of the swept wavenumber before and after the absorption peak wavenumber of water or water vapor.

Advantageous Effects of Invention

According to the infrared CD measurement apparatus as configured above, an infrared laser light of a high luminance, a high output and a wavenumber selected from broadband wavenumber can be used as a measurement light by a laser light source capable of sweeping an infrared laser light in a specific wavenumber range. As a result, an infrared CD of a sample having an absorbance of 2 or greater can be measured with a suitable signal-to-noise ratio, and measurement precision improves.

BRIEF DESCRIPTION OF DRAWINGS

FIG. 15 illustrates an infrared CD spectrum for comparison.

FIG. 16 illustrates an infrared CD spectrum of a sample having a high absorbance as a measurement example.

FIG. 17A and 17B illustrate infrared CD spectra of a sample measured with an accumulation time of 20 minutes as a measurement example.

FIG. 20A to 20D illustrate spectra as a 100% line to show an effect by an absorption avoidance processing of water vapor of the present embodiment.

DESCRIPTION OF EMBODIMENTS

Infrared CD Measurement Apparatus

Figure 1:
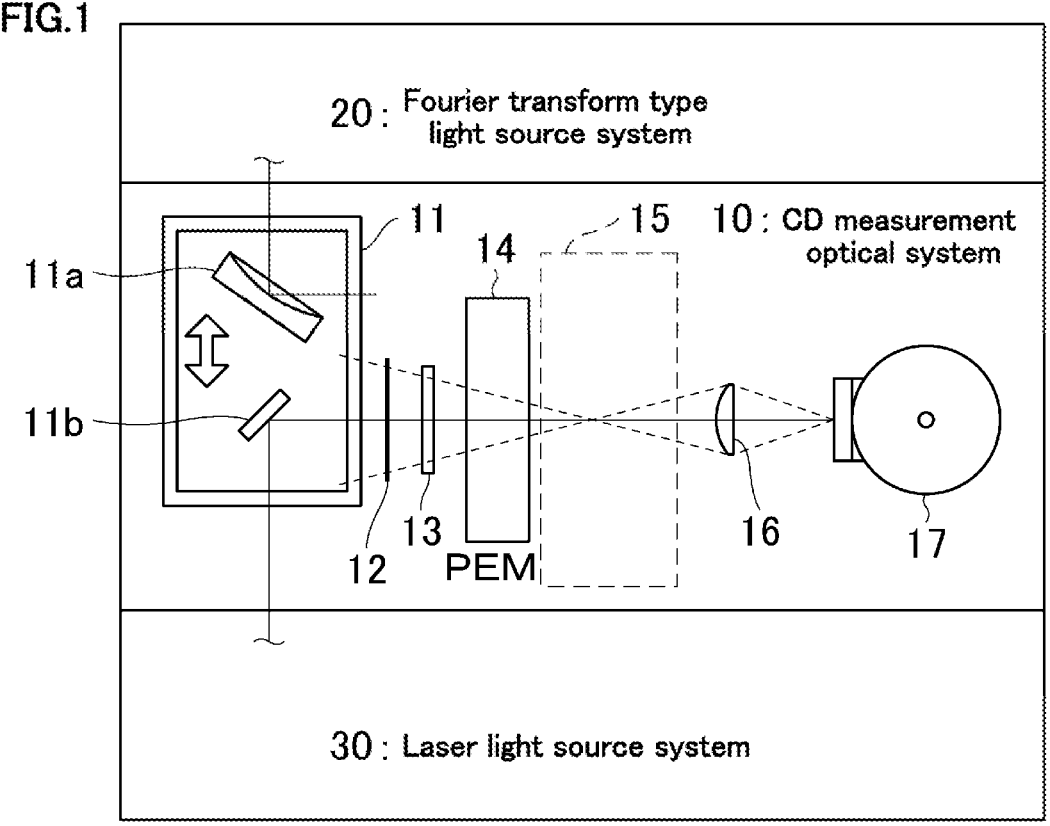
FIG. 1 illustrates a CD measurement optical system that configures an infrared CD measurement apparatus.

Embodiments of the present invention are described with reference to the drawings. A CD measurement optical system 10 configuring an infrared CD measurement apparatus is illustrated in FIG. 1. Along an optical axis of a measurement light, the CD measurement optical system 10 is disposed in the order of: an optical element on a movable block 11; an optical filter 12; a polarizer 13; a PEM 14; a sample chamber 15; a focusing lens 16; and an MCT detector 17. It is configured such that the measurement light can be selected form "a light of an infrared interference wave" and "an infrared laser light".

Figure 2:
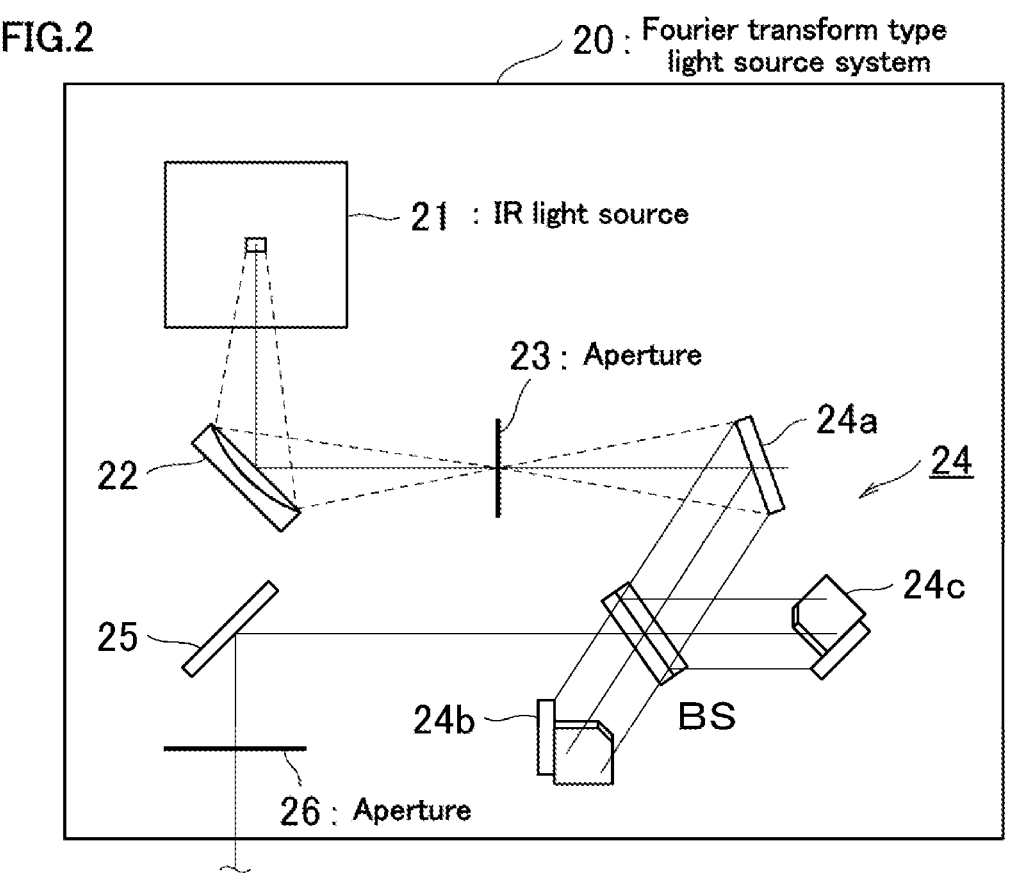
FIG. 2 illustrates a configuration of a Fourier transform type light source system.

The light of the infrared interference wave is supplied from a Fourier transform type light source system 20 (see FIG. 2). The laser light is supplied form a laser light source system 30 (see FIG. 3). Two types of optical elements (an ellipsoidal mirror 11a for the infrared interference wave and a plane mirror 11b for the laser) are installed in the movable block 11, and the measurement light to the CD measurement optical system 10 is switched by sliding the movable block 11 to dispose either one of the optical elements to the optical axis of the CD measurement optical system.

In the CD measurement optical system of FIG. 1, the selected measurement light is filtered and becomes only a light of a desired wavenumber range by the optical filter 12. Only a linearly polarized light component is taken out by the polarizer 13, and is sent to the PEM 14.

The optical direction of the optical axis of the polarizer 13 and the optical direction of the main axis of the PEM 14 are preferably in a relationship to intersect at 45 degrees when viewed from the optical axis of the measurement light. The polarization state of the linearly polarized light from the polarizer 13 is modulated by the PEM 14. Specifically, a phase difference δ between the two polarized light components perpendicular to each other of the linearly polarized light is modulated. Modulation of the phase difference δ is usually performed as a sine curve, and, in accordance therewith, the left-handed and right-handed circularly polarized lights are emitted alternately from the PEM 14 to the sample chamber 15.

The positional relationship between the PEM 14 and the sample chamber 15 is not limited to FIG. 1, and the PEM 14 may be disposed to the detector side of the sample chamber 15.

For example, a solution sample is put into a cell, and the cell is disposed in the sample chamber 15. The sample inside the cell alternately receives irradiation of the right-handed and left-handed circularly polarized lights from the PEM. The transmitted light of the sample is focused by the focusing lens 16, and a light intensity is detected by the MCT detector 17.

When the measurement light is the infrared interference wave, the interference wave becomes a linearly polarized interference wave by the polarizer 13 and the phase of the interference wave is modulated by the PEM 14, so that the sample receives an interference wave composed of the right-handed and left-handed circularly polarized lights. On the other hand, when the measurement light is the infrared laser light, the laser light becomes a linearly polarized laser light by the polarizer 13 and the phase of the laser light is modulated by the PEM 14, so that the sample receives a laser light composed of the right-handed and left-handed circularly polarized lights. When the infrared laser light has a high directivity, the focusing lens 16 may be omitted.

The detector 17 is not limited to MCT detectors. Detectors using quantum detecting elements such as Si photodiodes, InSb detectors, and InGaAs detectors, and detectors using pyroelectric elements such as TGS and DLaTGS may be selected suitably.

FIG. 2 illustrates a configuration of a Fourier transform type light source system (IR light source 21, ellipsoidal mirror 22, aperture 23, Michelson's interferometer 24, parabolic mirror 25 on an outgoing side, aperture 26). The Michelson's interferometer 24 is configured of a parabolic mirror 24a on an incident side, a beam splitter (BS), a fixed mirror 24b, and a moving mirror 24c. One of the parallel light fluxes split by the BS reflects off the fixed mirror 24b and returns to the BS, and the other split parallel light flux reflects off the moving mirror 24c and returns to the BS similarly. The two parallel light fluxes are synthesized at the BS, and is emitted to the parabolic mirror 25 as the interference wave. Accordingly, the interference wave (interferogram) related to the optical path difference D that can be varied by the moving mirror 24c is generated. The light of the infrared interference wave reflects off the parabolic mirror 25 on the outgoing side, and travels to the ellipsoidal mirror 11a of the movable block 11 of the CD measurement optical system 10 to be used as the measurement light.

Figure 3:
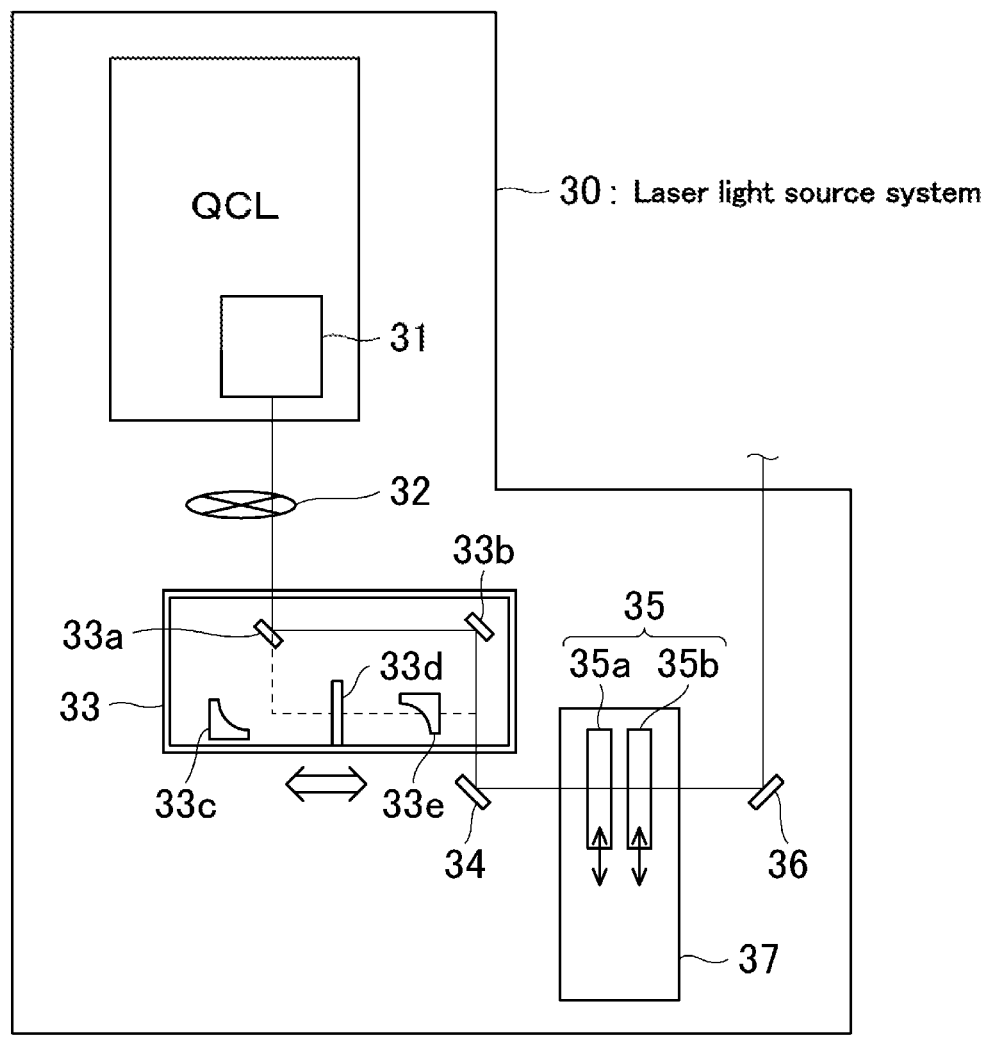
FIG. 3 illustrates a configuration of a laser light source system.

FIG. 3 illustrates a configuration of the characteristic laser light source system 30 in the present embodiment. The laser light source system 30 has a quantum cascade laser (QCL) as the infrared light source, so that it supplies an infrared laser light having a high luminance, a high output and a specific wavenumber that is selected from broadband wavenumber.

Figure 4:
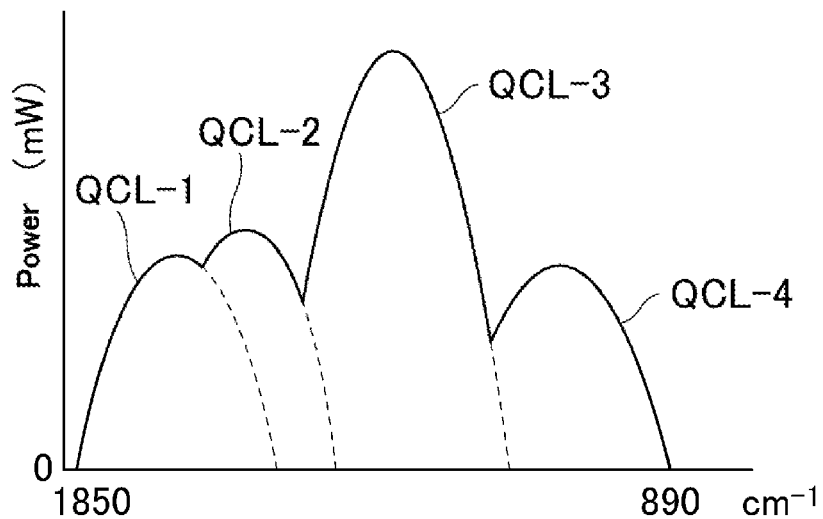
FIG. 4 illustrates overlapped wavenumber tuning curves of each semiconductor chip of a QCL.

QCLs have one or more semiconductor chip in which there is an active region multilayer semiconductor structure. Since injected electrons pass the layers of the active region like a waterfall and a large number of photons are released, the QCL has a high laser gain and a wide wavenumber range. For example, with respect to a case of which the wavenumber range is widened to a fingerprint region (1850 to 890 $cm^{-1}$) by using four semiconductor chips (QCL-1 to QCL-4), wavenumber tuning curves of each semiconductor chip are superimposed in FIG. 4. The wavenumber range of the QCL-1 may be about 1850 to 1500 $cm^{-1}$, the wavenumber range of the QCL-2 may be about 1750 to 1400 $cm^{-1}$, the wavenumber range of the QCL-3 may be about 1500 to 1100 $cm^{-1}$, and the wavenumber range of the QCL-4 may be about 1300 to 890 $cm^{-1}$. When converted to a wavelength region, it becomes 5.4 to 11.2 μm.

In the QCL, the wavenumber of an output laser light is varied by a driving portion 31 embedded therein. For example, a resonator (cavity) as the driving portion sweeps an output wavenumber.

Figure 5:
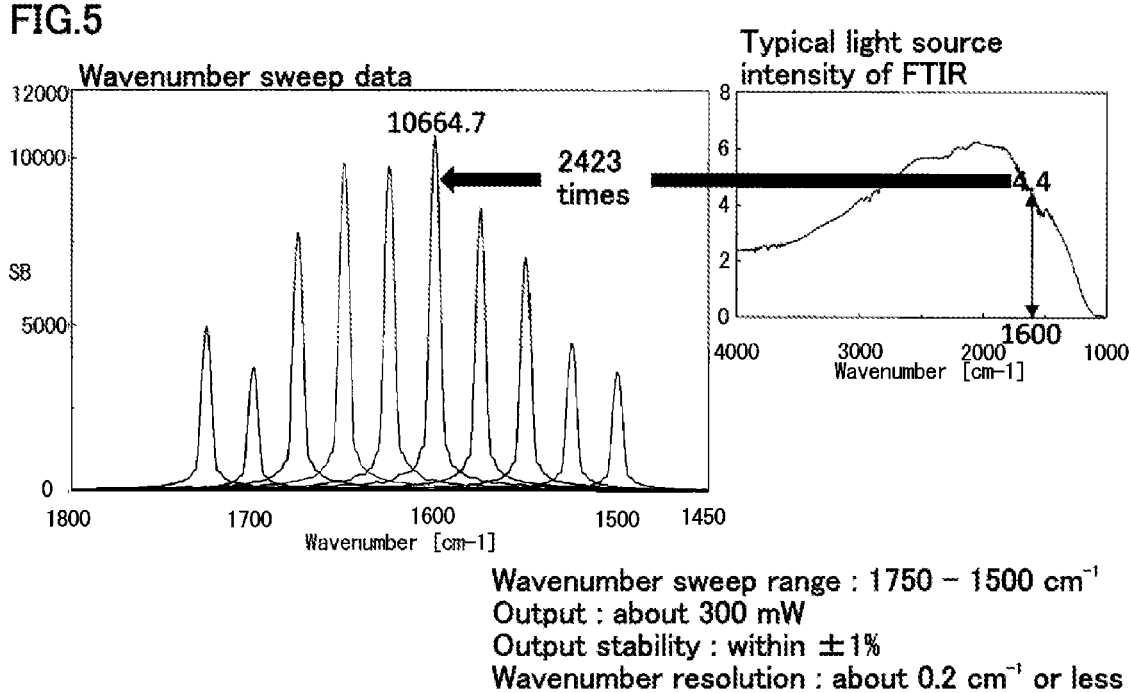
FIG. 5 illustrates a variation in intensity of a laser light when the wavenumber of the laser light is swept from 1750 $cm^{-1}$ to 1500 $cm^{-1}$.

FIG. 5 illustrates a variation in intensity of the laser light of when the wavenumber is swept from 1750 $cm^{-1}$ to 1500 $cm^{-1}$ by only using the QCL-2. For comparison, one that measured a spectral shape of a typical infrared light source of a Fourier transform infrared spectrometer (FTIR) under the same condition is also illustrated in FIG. 5. When the laser light is continuous mode and a maximum power at 1600 cm–1, an average output is about 300 mW.

When the average output of the using laser is at least 1 mW or greater, a detected signal can be achieved better quality than a detected signal acquired by a conventional measurement apparatus. It is preferably 10 mW or greater, and more preferably 100 mW or greater. Quality of the detected signal generally improves in proportion to the output by using a laser having an average output of 1 mW to about several hundred mW. When a laser having a high average output is used, limitation against burnout of a sample or sensitivity saturation of a detector arises; therefore, a laser having an average output of about 1 W to 10 W at largest is preferred. Since the output that cause burnout differs depending on the sample and also the amount of the detected light varies depending on the sample, the average output of the laser may be selected depending on the sample such that the effect of the present invention can be exhibited at most. When a gain switching device (e.g., a light attenuator) is provided in the measurement apparatus, a laser having a larger average output can be mounted since a light reduction rate of the laser light can be adjusted.

When both spectral shapes are compared at the same wavenumber (e.g., 1600 $cm^{-1}$) in the example of FIG. 5, the output value of the typical light source of the FTIR is 4.4, whereas the output of the QCL is 10664.7, which is 2423 times than that of the typical light source of the FTIR. Therefore, it can be seen that the difference between the output intensities is very large.

Figure 6:
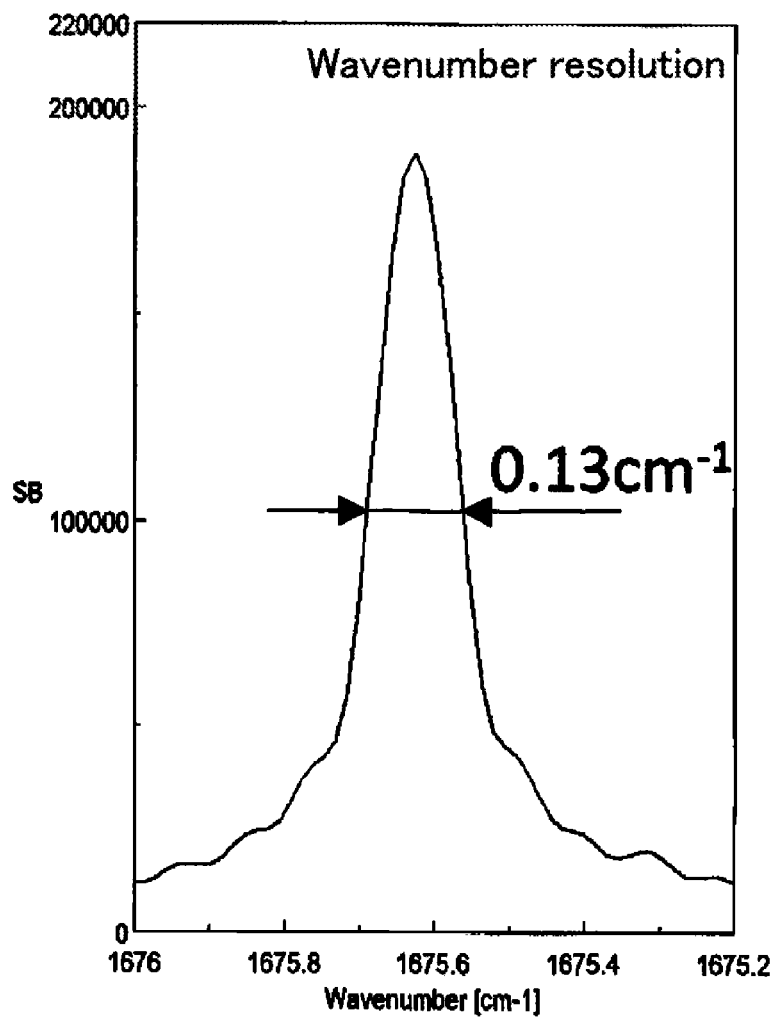
FIG. 6 illustrates an oscillation linewidth of a laser light of 1675.5 $cm^{-1}$ of a QCL.

Next, the oscillation linewidth at 1675.5 $cm^{-1}$ of the laser light from the QCL is enlarged in FIG. 6. The narrower the oscillation linewidth (full width at half maximum) of the laser light, the higher the wavenumber resolution of the laser light. The full width at half maximum of the laser light is 0.13 $cm^{-1}$. The oscillation linewidth (full width at half maximum) of the laser light is preferably about 0.05 to 4.0 $cm^{-1}$.

Characteristic features of the laser light of the QCL are as follows: (1) a wavenumber range that can be swept is wide; (2) the output is surprisingly strong; and (3) the oscillation linewidth (full width at half maximum) is very narrow. The QCL outputs a laser light of a specific wavenumber in a continuous mode (CW mode). A QCL that can select a pulse mode may be used, but the detection signal of the CW mode is larger and measurement precision is better.

Going back to FIG. 3, a rotational chopper 32, two plane mirrors 33a, 33b on a movable block 33, a fixed plane mirror 34 on a light attenuator entry side, a light attenuator set 35, and a fixed plane mirror 36 on a light attenuator exit side are disposed sequentially on the path of the infrared laser light from the QCL. Other than the two plane mirrors, optical elements (an ellipsoidal mirror 33c on an entry side, an aperture 33d, and an ellipsoidal mirror 33e on an exit side) are mounted in the movable block 33 to form the optical path which passes through the aperture. By sliding the movable block 33, the optical path can be switched to the optical path that does not pass through the aperture 33d and the optical path that passes through the aperture 33d. In the latter optical path, the cross section of the light flux of the laser light is expanded by the ellipsoidal mirrors 33c, 33e in front of/at the back of the aperture 33d, and becomes the size of an opening of the aperture 33d.

The infrared laser light from the QCL becomes an intermittent laser light depending on the passing rate of the rotational chopper 32. This laser light travels along the optical path on the movable block, further passes through the light attenuator set 35, and travels to the plane mirror 11b on the movable block 11 of the CD measurement optical system 10 to be used as the measurement light.

A circular dichroism CD of the sample is defined with the equation (2).

[Math. 1]
$$\Delta A = A_L - A_R = \log\left(\frac{I_L}{I_0}\right) - \log\left(\frac{I_R}{I_0}\right) = \log\frac{I_L}{I_R} \quad (2)$$

The circular dichroism CD is a difference ($\Delta A$) between an absorbance $A_L$ of the sample for a left-handed circularly polarized light and an absorbance $A_R$ of the sample for a right-handed circularly polarized light. As in the equation (2), the $\Delta A$ is represented with a common logarithm of a ratio of a light intensity $I_L$ of the left-handed circularly polarized light and a light intensity $I_R$ of the right-handed circularly polarized light that transmitted through the sample. A light intensity $I_0$ is intensity of an incident light to the sample. Since the difference ($\Delta A$) in the absorbances is a dimensionless number, the $\Delta A$ is usually converted into an ellipticity (CD[mdeg]) as in the following equation (3).

[Math. 2]
$$CD[mdeg] = \frac{\ln 10}{4} \cdot \frac{180000}{\pi} \cdot \Delta A \quad (3)$$

Here, when the light intensity $I_L$ of the left-handed circularly polarized light and the light intensity $I_R$ of the right-handed circularly polarized of the equation (2) are measured based on a polarization modulation method using the PEM, an average value thereof (($I_L+I_R$)/2) corresponds to a "DC signal" in the waveform of the light intensity in the polarization modulation method, and a half of the difference thereof (($I_L-I_R$)/2) corresponds to a "maximum amplitude of AC signal" in the waveform of the light intensity in the polarization modulation method. When a model of first order Bessel function $J_1$ ($2\pi\delta_0$) is applied, the waveform of the light intensity I in the polarization modulation method is represented as a sum of the DC signal component and the AC signal component. Accordingly, the equation (3) can be expressed like the following approximate equation.

[Math. 3]
$$CD[mdeg] = \frac{\ln 10}{4} \cdot \frac{180000}{\pi} \cdot \frac{2 \cdot AC}{DC} \cdot \log e \quad (4)$$

That is, if the AC signal and the DC signal can be extracted from the detected waveform data of the light intensity, a CD value can be measured.

Figure 7:
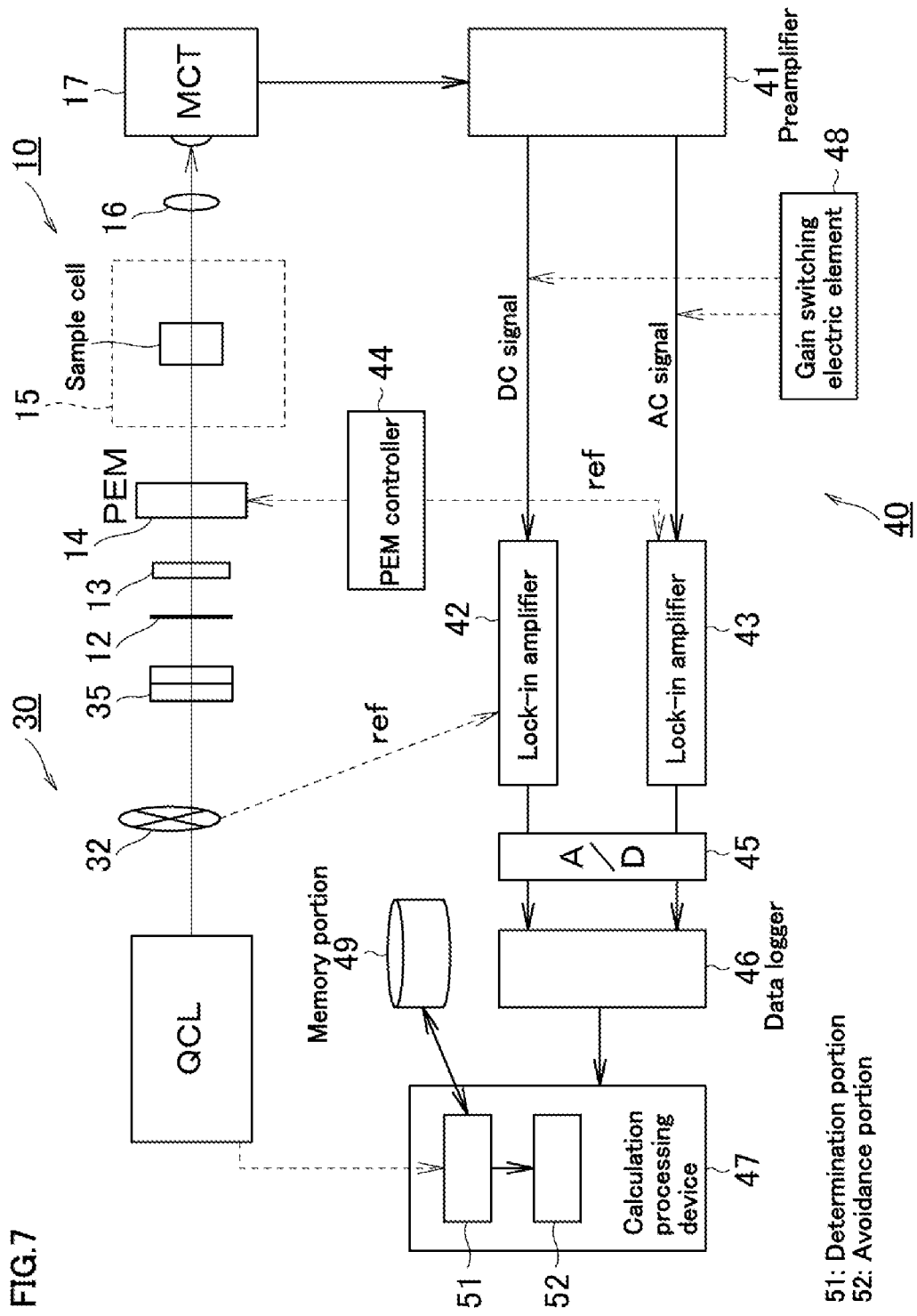
FIG. 7 illustrates a whole configuration of an infrared CD measurement apparatus using a laser light.

FIG. 7 illustrates a whole configuration of the infrared CD measurement apparatus using the infrared laser light. In FIG. 7, a configuration of a signal processing device 40 (a preamplifier 41, a lock-in amplifier 42 for a DC signal, a lock-in amplifier 43 for an AC signal, a PEM controller 44, an analog-to-digital (A/D) convertor 45, a data logger 46, and a calculation processing device 47 such as a computer) is also illustrated. A light intensity signal from the detector 17 is amplified by the preamplifier 41, and each signal of the direct-current component and the alternating-current component from the preamplifier 41 is sent to the lock-in amplifiers 42, 43 respectively.

The lock-in amplifier 42 for the DC signal uses a reference signal that synchronizes with a chopping frequency to extract the DC signal from the signal of the direct-current component of the preamplifier. That is, the lock-in amplifier 42 extracts a signal value of the direct-current component in a light-blocked period by the rotational chopper 32 and a signal value of the direct-current component in a passing period by the rotational chopper 32 to store in the data logger 46. A difference between the signal values of the light-blocked period and the passing period is used as the DC signal.

The lock-in amplifier 43 for the AC signal uses a reference signal that synchronizes with a drive frequency of the PEM 14, and extracts the AC signal that has the same frequency component as the PEM 14 from a signal of the alternating-current component of the preamplifier 41 to store in the data logger 46.

When storing the signals in the data logger 46, the DC signal and the AC signal are quantified by the A/D convertor 45. The calculation processing device 47 reads out the AC signal and the DC signal, acquires a ratio (AC/DC) of the both signals, and calculates the infrared CD value based on the equation (4).

The calculation processing device 47 calculates the infrared CD value for each wavenumber selected in the QCL, so that a CD spectral data in the infrared region can be acquired since the measurement light is an infrared laser light.

When the light of the infrared interference wave of FIG. 2 is selected as the measurement light, the result of calculation based on the light intensity signal is not the CD value itself since the light intensity signal is an interferogram. Therefore, the calculation processing device reads out the AC signal and the DC signal from the data logger 46, and Fourier-transforms the value of the ratio (AC/DC) from the both signals to acquire the CD spectral data in the infrared region. A mathematical equation which replaced "AC/DC" in the above equation (4) to "F[AC/DC]" becomes an approximate equation of the CD value using Fourier transformation. F[ ] in the equation represents Fourier transformation.

Evaluation of Efficacy of $N_2$ Purging

Required time for nitrogen gas replacement ($N_2$ purging) and its efficacy are evaluated by using the experimental apparatus based on FIG. 7. In the experimental apparatus, an output wavenumber range of the QCL is set to 1750 to $1500^{-1}$ cm, the chopping frequency of the chopper is set to 500 Hz, and the transmission rate of the light attenuator (e.g., ND filter) is set to 2%. The sample is not placed in the sample chamber, and the laser light is detected with the MCT detector without driving the PEM.

The preamplifier 41 of the signal processing device 40 sends a signal of the DC component to the lock-in amplifier after filtering at 400 Hz.

In a state "without purging", the wavenumber of the laser light is swept in a range of 1750 to 1500 cm$^{-1}$, and the light intensity is detected by the MCT detector in 1 cm$^{-1}$ steps. A step rate is 500 msec/cm$^{-1}$. The result is illustrated as the spectrum A in FIG. 8. Without purging, it can be seen that an influence of absorption by water vapor in each housing is large over the entire wavenumber range.

Figure 9:
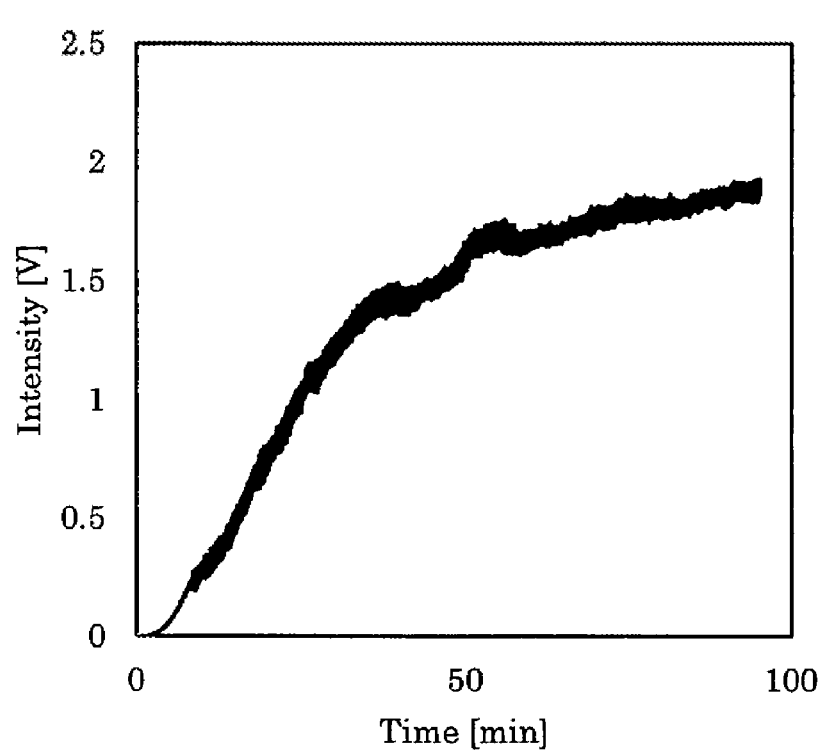
FIG. 9 illustrates a variation in intensity of a laser light from the start of purging to 90 minutes after the start.

Next, the wavenumber of the laser light is fixed at 1635 cm$^{-1}$, and the insides of the housings in which the CD measurement optical system 10 and the laser light source system 30 are stored are purged with N$_2$ at a gas supply amount of 6 L per minute. Each housing has purging apparatuses that can be controlled independently. Most of the laser light at 1635 cm$^{-1}$ wavenumber is absorbed by water vapor inside the apparatus, so that it is suitable for evaluating efficacy of N$_2$ purging. FIG. 9 illustrates a variation in intensity of the laser light at 1635 cm$^{-1}$ wavenumber from the start of purging to 90 minutes after the start. By purging for a relatively short time of about one hour, replacement to nitrogen largely proceeded, and it can be seen that two hours of purging is sufficient.

Figure 8:
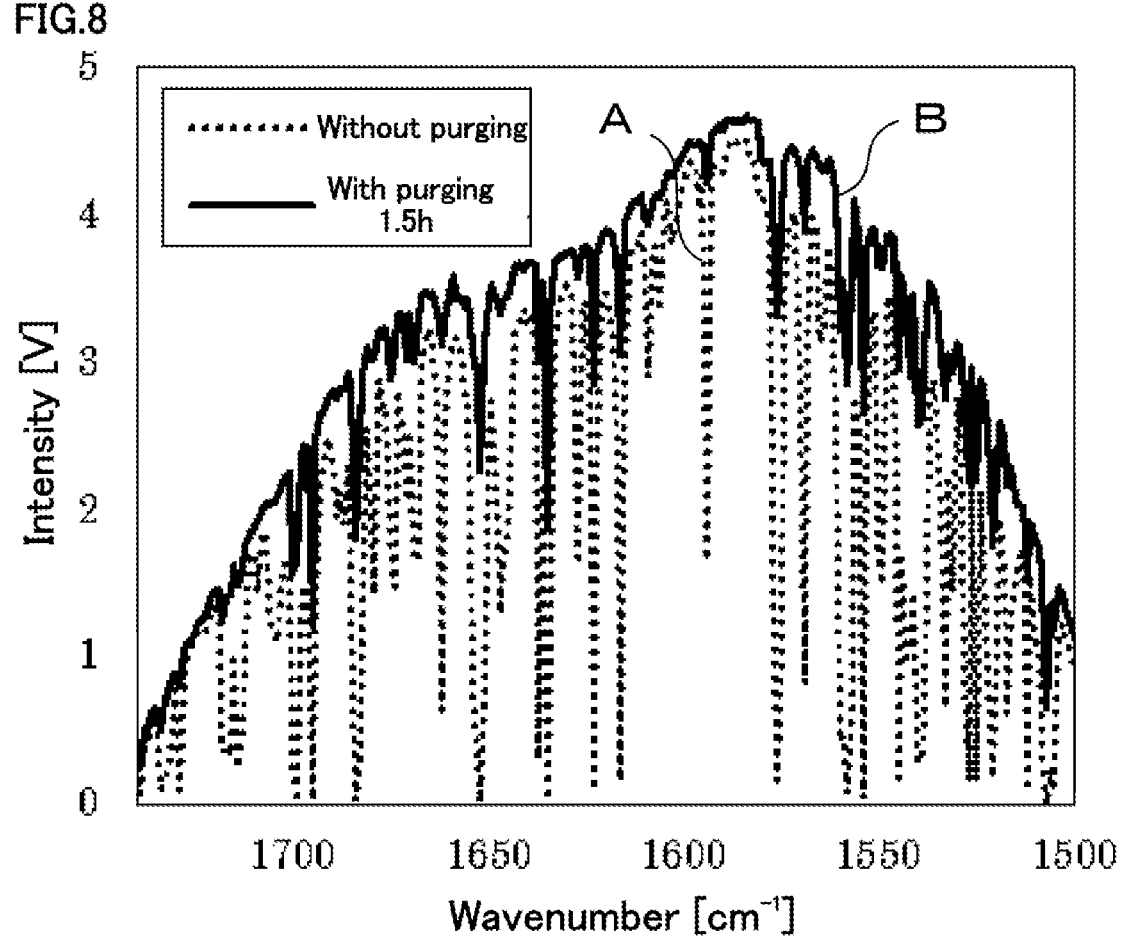
FIG. 8 illustrates a spectrum showing effectiveness of $N_2$ purging.

Like the spectrum A of FIG. 8, a spectrum B is measured in a state of "after 90 minutes purging". The absorption peak by water vapor is remarkably decreased, and it can be seen that the influence of water vapor is greatly reduced by purging for a relatively short time.

Figure 10:
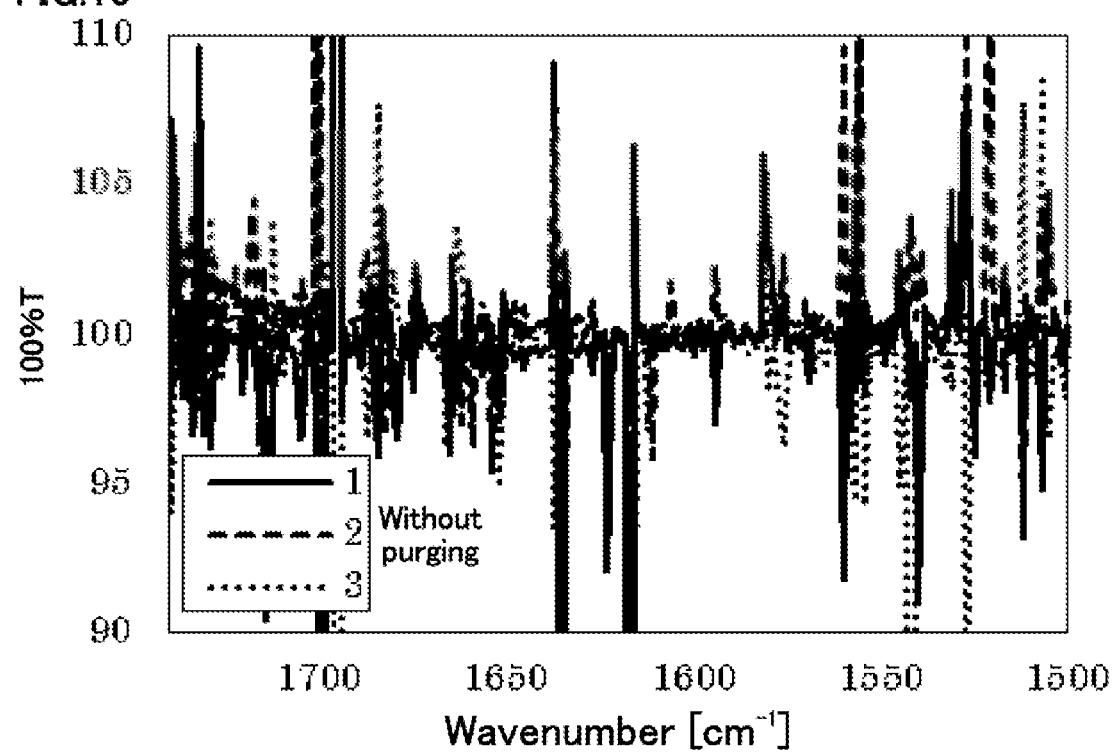
FIG. 10 illustrates a spectrum measured without purging as a 100% transmittance line.
Figure 11:
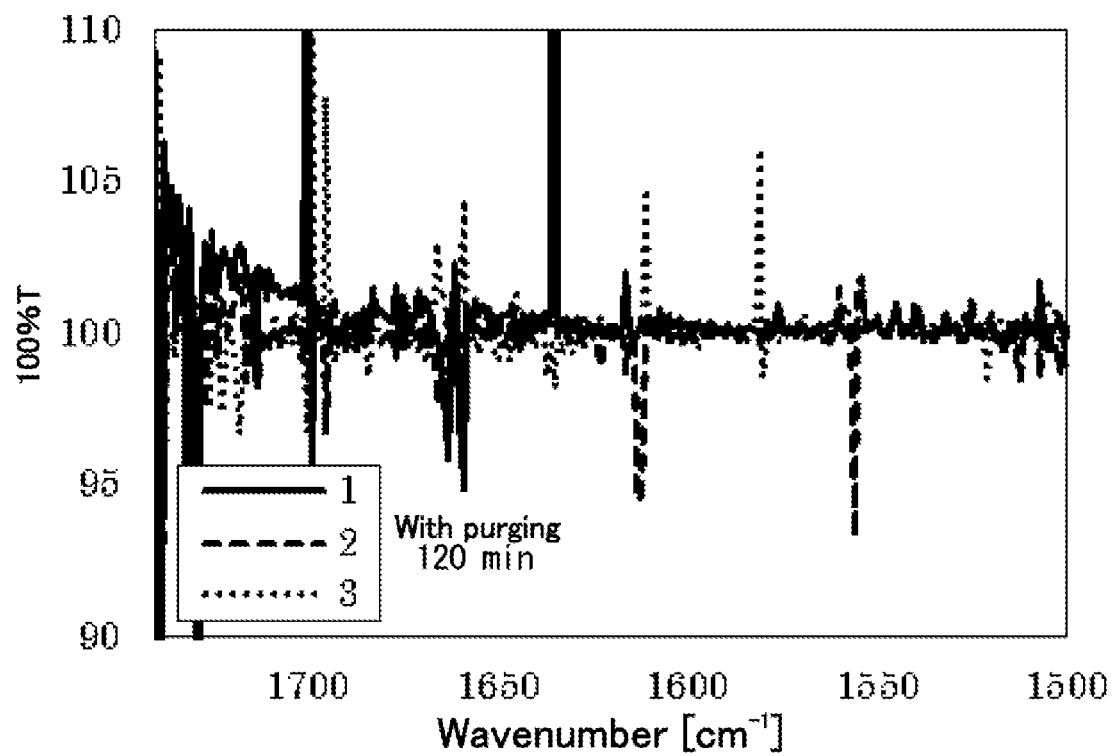
FIG. 11 illustrates a spectrum measured with purging as a 100% transmittance line

Next, a spectrum is measured like the spectrum A of FIG. 8 in a state "without purging", and a 100% transmittance line in which the transmittance T (=I/I$_0$×100) of the laser light is 100% is illustrated in FIG. 10. Spectral measurement in a state without purging is repeated for three times, and the three results are overlapped in FIG. 10. On the other hand, a spectrum is measured in a state "after 120 minutes of purging", and the 100% transmittance line is illustrated in FIG. 11 similarly.

It can be seen in FIG. 10 that the influence of absorption by water vapor has occurred like noise over the entire wavenumber range. Even with the laser light at the same wavenumber, the 100% transmittance line may be pushed up, or pushed down. On the other hand, in the 100% transmittance line after purging in FIG. 11, it can be seen that the influence of absorption by water vapor is greatly decreased over the entire wavenumber range.

Individual Evaluation of Efficacy of N$_2$ Purging

Figure 12:
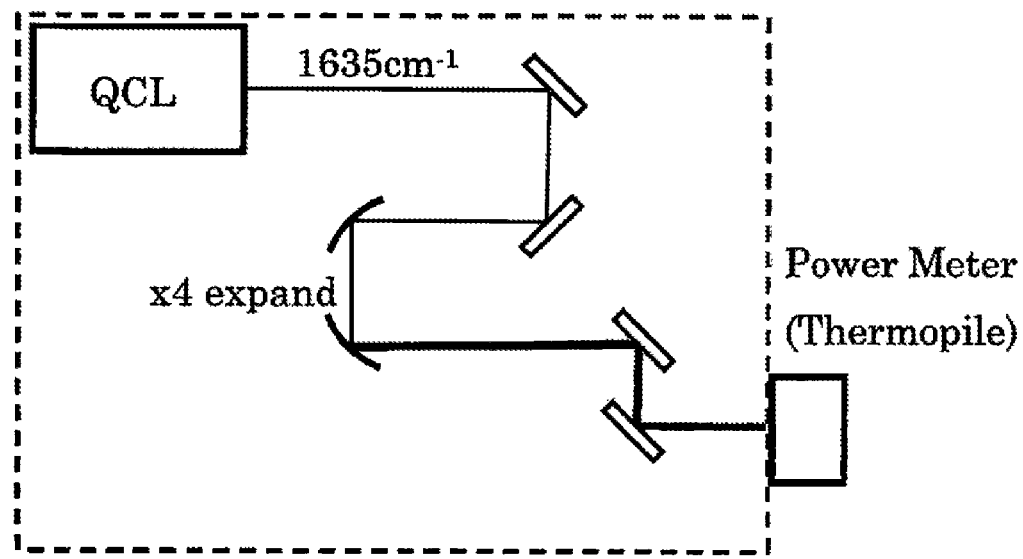
FIG. 12 illustrates an experimental apparatus for evaluating effectiveness of $N_2$ purging individually.

Next, efficacy of N$_2$ purging to the laser light source system 30 is evaluated individually. An experimental apparatus shown in FIG. 12 is used. The wavenumber of the laser light is fixed at 1635 cm$^{-1}$, and the inside of the housing of the laser light source system 30 is purged with N$_2$. A pair of reflection mirrors for 4 times expansion is disposed on the optical path inside the housing to quadruple the beam diameter. The intensity of the laser light is detected with a power meter (thermopile type detector) disposed at the exit of the laser light source system 30.

Figure 13:
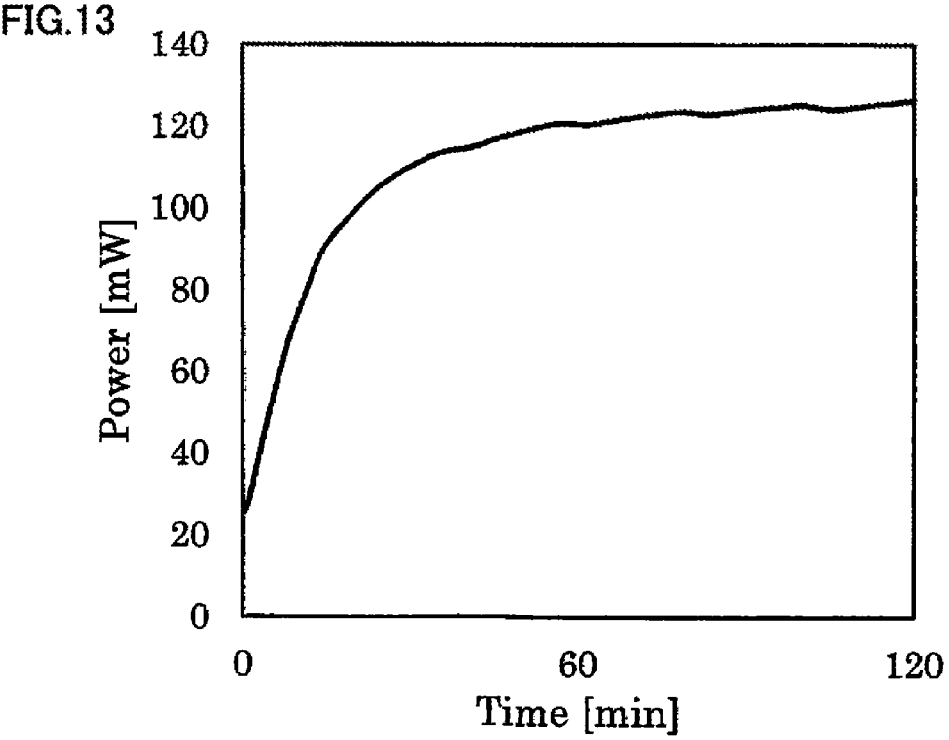
FIG. 13 illustrates a result of measuring a variation in intensity of the laser light from the start of purging to 120 minutes after the start by using the experimental apparatus of FIG. 12.

FIG. 13 illustrates a variation in intensity of the laser light of 1635 cm$^{-1}$ wavenumber from the start of purging to 120 minutes after the start. The intensity, which is about 28 mW at the start of purging, has rapidly increased after the first 30 minutes, and reached around 120 mW after 60 minutes. A preliminary measurement of the following Table 1 is performed to evaluate this purging effect in detail.

Table 1 shows a result of measuring the intensities of two laser lights of 1635 cm$^{-1}$ wavenumber and of 1600 cm$^{-1}$ wavenumber, which is hardly affected by absorption of water vapor with the power meter directly after the QCL. Moreover, the intensity at the exit ("connecting portion") of the laser light optical system 30 is measured by the experimental apparatus of FIG. 12. Either case is measured in a state "without purging".

The values in brackets in the table are measurement values upon 4× expansion. The intensity values in the sample chamber are also shown as references.

TABLE 1

|  | 1600 cm$^{-1}$ | 1635 cm$^{-1}$ |
| --- | --- | --- |
| Light source [mW] | 295 | 190 |
| Connecting portion [mW] | 250 (192.6) | 28.6 (28.0) |
| Sample chamber [mW] | 143 (91.6) | 8.1 (7.9) |

Assuming that there is no influence of water vapor directly after the light source, a ratio $P_{ratio}(=P_{1635}/P_{1600}=190/295)$ of the laser light intensity directly after exiting the QCL is calculated as 0.644. Since the laser light of 1600 cm$^{-1}$ is hardly affected by water vapor, when the light intensity at 1635 cm$^{-1}$ at the connecting portion is calculated based on the light intensity (192.6 mW) at 1600 cm$^{-1}$ at the connecting portion, $P_{1635}(=192.6*0.644)$ is 123.7 mW. This value corresponds to a value of when the laser light of 1635 cm$^{-1}$ is not affected by water vapor. According to FIG. 13, the light intensity at the connecting portion after 60 minutes of purging has recovered to around 120 mW (a value close to the calculated value of 123.7 mW as described above), so that it can be evaluated that replacement is sufficiently carried out with about 1 hour of N$_2$ purging.

From these evaluation results, it can be seen that the purging effect can be exhibited in a short time by providing the N$_2$ purging apparatus in respective housings in the infrared CD measurement apparatus of the present embodiment.

Infrared CD Measurement Result 1

With the infrared CD measurement apparatus configured as in FIG. 7, an infrared CD spectrum of a solution sample of which Bi-2-naphtol is dissolved in a chloroform solvent is measured. In this apparatus, the wavenumber range of the laser light of the QCL is set to 1650 to 1500 cm$^{-1}$, the chopping frequency of the chopper is set to 500 Hz, and the transmittance of the light attenuator (e.g., ND filter) is set to 2% (98% of light attenuation). Having the modulation frequency of the PEM as 50 kHz, the transmitted light of the sample is detected with the MCT detector.

Figure 14:
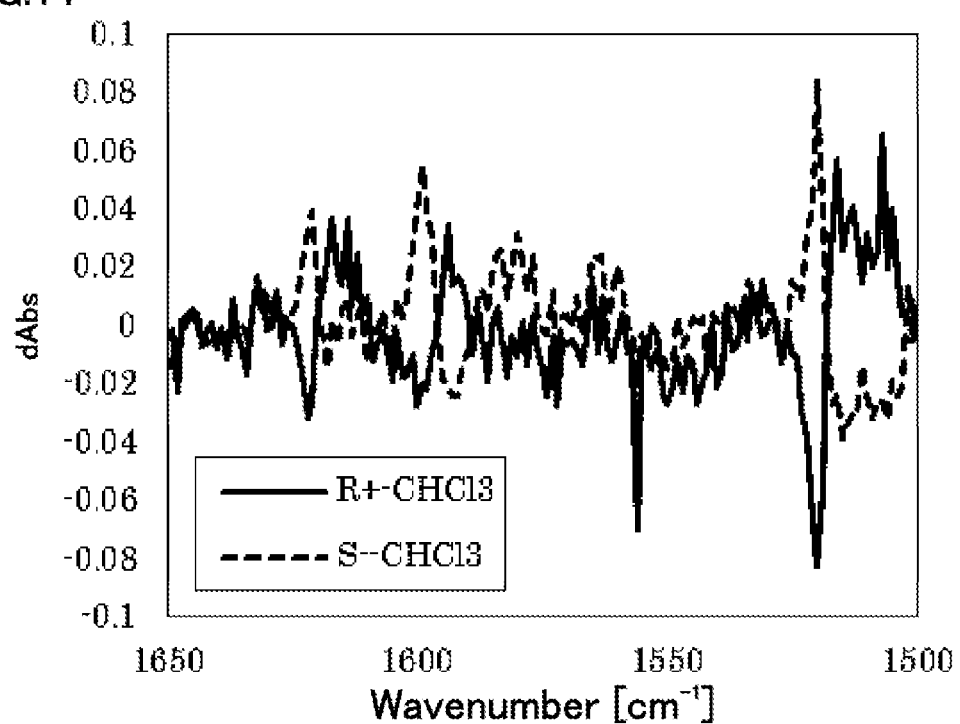
FIG. 14 illustrates an infrared CD spectrum as a measurement example of the present embodiment.

Before the measurement, the insides of the housings that contain the CD measurement optical system 10 and the laser light source system 30 are purged with N$_2$ for 120 minutes at a gas supply amount of 6 L per minute. In the infrared CD measurement, the wavenumber of the laser light is swept for three times in a range of 1650 to 1500 cm$^{-1}$, and the light intensity is detected at a 1 cm$^{-1}$ step by the MCT detector to calculate the average value. The infrared CD spectrum thereof is shown in FIG. 14. The measurement result with a Fourier transform CD spectrometer is shown in FIG. 15 for comparison.

The infrared CD spectrum measured with the infrared CD measurement apparatus according to the present embodiment has the following point to be focused. First, it is obvious from the comparison with the infrared CD spectrum measured by the Fourier transform CD spectrometer that the wavenumber resolution is extremely high.

When two CD peaks of which the sample originally has are adjacent to each other and, relative to one peak wavenumber ν, the other peak wavenumber is represented as ν+Δν, a minimum value of Δν between the two CD peaks that can be distinguished by the measurement apparatus is represented as a wavenumber resolution ($cm^{-1}$) herein.

As shown in FIG. 11, influence of absorption of water vapor in the wavenumber range of 1650 to 1500 $cm^{-1}$ is remarkably decreased by 120 minutes $N_2$ purging. In that case, it can be said that influence of water vapor is smaller in the infrared CD spectrum of FIG. 14, and a minute CD peak, which could not be measured with the Fourier transform CD spectrometer, can be measured.

One reason that the wavenumber resolution is high is that, although the measurement range (vertical axis) of the infrared CD spectrum by the Fourier transform CD spectrometer is about −0.0001 to +0.0001, the measurement range of the apparatus by the present embodiment is about −0.08 to +0.08, which is approximately 1000 times wider. That is, the detection signal from the detector becomes larger by the laser light having an extremely strong output like FIG. 6, and the detection sensitivity of the absorbance A has increased. In accordance therewith, infrared CD signals, of which only very weak ones could be measured conventionally, can now be acquired in very large values.

The second reason is that the laser light having a profile (full width at half maximum: 0.13 $cm^{-1}$) close to an ideal single wavenumber light like FIG. 6 is used.

An advantage of the apparatus of the present embodiment will be understood in more detail by considering the problems in conventional dispersive CD spectrometers. For example, in CD spectrometers for UV-visible light region, a dispersive CD spectrometer using a diffraction grating is the main stream.

In dispersive CD spectrometers, it is said that, in order to improve the wavelength resolution, the band width (full width at half maximum) of the light taken out from the dispersive spectrometer is preferably set to about ⅒ or lower of the full width at half maximum of the absorption peak of the sample. For example, an error in measurement values can be suppressed by measuring the absorption peak having a full width at half maximum of 15 nm by an pseudo-monochromatic light having a band width of 2 nm.

The band width is determined by a width of a slit installed in the spectrometer. Accordingly, it cannot be said that it is sufficient to simply set a narrow band width. It is because, if the band width is narrow, the light irradiating the sample becomes weak, and noise increases.

The apparatus of the present embodiment is superior in the point that the full width at half maximum of the laser light of the swept specific wavenumber is narrow, which can be regarded as an ideal monochromatic light, and that the output of the laser light can be kept at a high state. Accordingly, a strong detection signal can be acquired from the detector, and a measurement sensitivity of the infrared CD value improves. In Fourier transform or dispersive CD spectrometers, the detection signal tends to be weakened by narrowing the light flux of the interference wave with an aperture or narrowing the band width of the monochromatic light with a slit. Therefore, the absorbance of the sample had to be adjusted to 1.5 to less than 2 at highest so that the signal-to-noise ratio is not deteriorated. The apparatus of the present embodiment is superior in the point that it has no limitation for the absorbance of the sample.

Infrared CD Measurement Result 2

FIG. 16 illustrates a result of performing an infrared CD spectral measurement to an amino acid solution sample (Fmoc-Leucine), of which its absorbance is adjusted to 4 by using the apparatus of the present embodiment, at a resolution of 0.0001 ΔA.

Infrared CD Measurement Result 3

FIG. 17A and 17B illustrate results of performing an infrared CD spectral measurement to a pinene solution sample ((−)-α-pinene) for an accumulation time of 20 minutes by using the apparatus of the present embodiment. Two types of element sizes (1 mm diameter, 0.2 mm diameter) of the MCT detectors are used, and infrared CD spectra with good sensitivity are acquired in a short accumulation time in both measurements.

In the following, configurations that can be equipped to the infrared CD measurement apparatus of the present embodiment as an option are described.

Optical Gain Switching Device

A switching device 37 of the light attenuating set 35 of FIG. 3 that is characteristic in the present embodiment is described. The light attenuating set 35 is configured of one or a plurality of light attenuating elements 35a, 35b, and comprises the switching device 37 that can switch each light attenuating element 35a, 35b to online/offline independently. For example, two light attenuating elements 35a, 35b having 2% transmittance are used. Since the total transmittance becomes 0.04% when both of them are set online simultaneously, the switching device 37 can switch the total transmittance by the light attenuating set 35 to 100%, 2% and 0.04%. The light attenuating set 35 may be disposed in any position on the optical path of the laser light.

In the present embodiment, a measurement gain is optically switched by the switching device 37 of the light attenuating set 35. First, as a preliminary measurement, only one light attenuating element 35a is set to be online, and the wavenumber of the laser light is swept to execute a background measurement. A gain is set individually to the wavenumber of which the acquired output is below the reference value. For example, when the light to the detector 17 is dark, both of the light attenuating elements 35a, 35b may be set offline. On the other hand, to the wavenumber of which the output in the preliminary measurement is too strong, both of the light attenuating elements 35a, 35b may be set online. The measurement condition is stored in a memory portion 49. When the sample is spectrally measured, the measurement gain is optically switched for each swept wavenumber in accordance with the stored set value. As a result, a variation in the amount of light to the detector 17 depending on the swept wavenumber of the laser light can be suppressed.

Moreover, when a sample is placed in the optical system of which the amount of light attenuation is optimized in a state without the sample in advance, the output may be decreased depending on the swept wavenumber due to the absorbance of the sample being too large. With respect to such wavenumber, the amount of light attenuation can be adjusted by setting the measurement condition, such as making the light attenuating elements 35a, 35b offline.

The switching device 37 of optical gain as described above makes the infrared CD spectrum measurement of a sample having a high absorbance easier. When the gain is optically varied by the light attenuating elements 35a, 35b, a baseline of the spectrum deviates; however, by providing a means for executing spectral measurement of which a part of the swept wavenumber region before and after the gain is varied is overlapped, the baseline can be connected easily by the calculation processing device 47 when the measurement result thereof is used.

Electric Gain Switching Device

Like the optical gain switching, an electric switching of the gain can also be adopted. For example, with respect to the swept wavenumber of which the leaser light output becomes low, a gain switching electric element 48 provided to the signal processing device 40 of FIG. 7 electrically amplifies the intensity of the analogue signal, so that a quantization error at the A/D convertor 45 may be reduced.

Passing Rate of the Chopper

Next, setting of the passing rate of the chopper 32 is described. The chopper 32 is provided to acquire an infrared absorption signal (DC signal). It is not limited to the position of FIG. 7, and it may be positioned on anywhere on the optical path of the laser light.

The signal intensity of the infrared CD signal is $1/1000$ or less, and it is extremely weak compared to the infrared absorption signal. Chopping leads to further decrease of the intensity of the infrared CD signal, and also decreases its signal-to-noise ratio simultaneously. In the present embodiment, the passing rate of the chopper 32 is set at 70% or greater based on a test result using a rotational chopper having three passing rates (50%, 75%, 83%).

Figure 18:
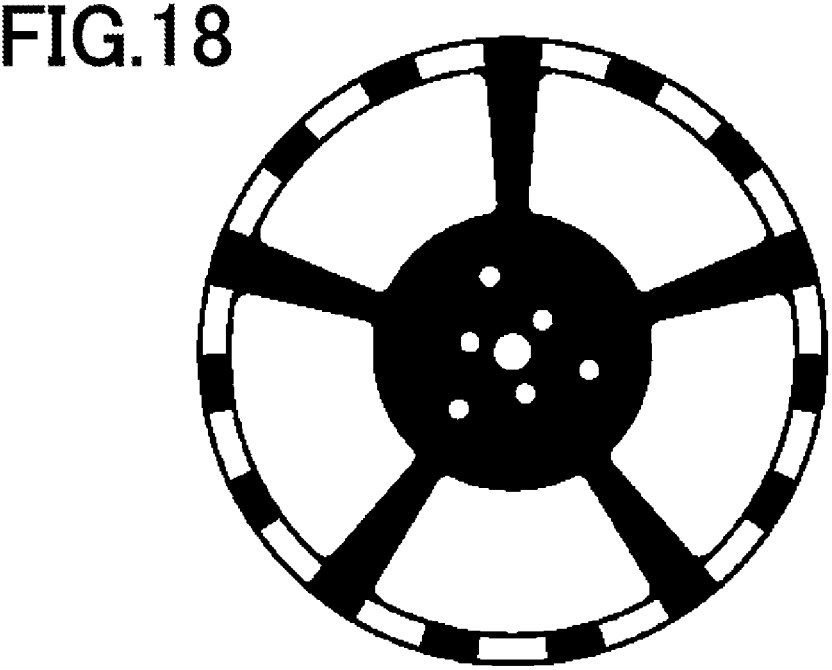
FIG. 18 illustrates a rotational chopper having 83% passing rate used in a chopping test.

FIG. 18 illustrates an example of a rotational chopper having the passing rate (also called as a duty) of 83% used in a chopping test. Rib portions extending from the center in five directions function as light blocking portions.

Figure 19A:
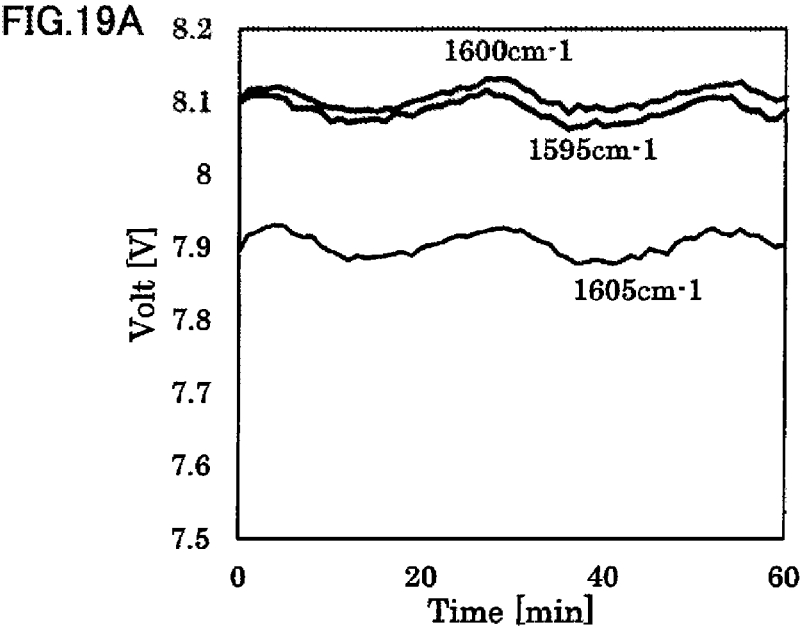
FIG. 19A and 19B illustrate test results that used the rotational chopper of FIG. 18.
Figure 19B:
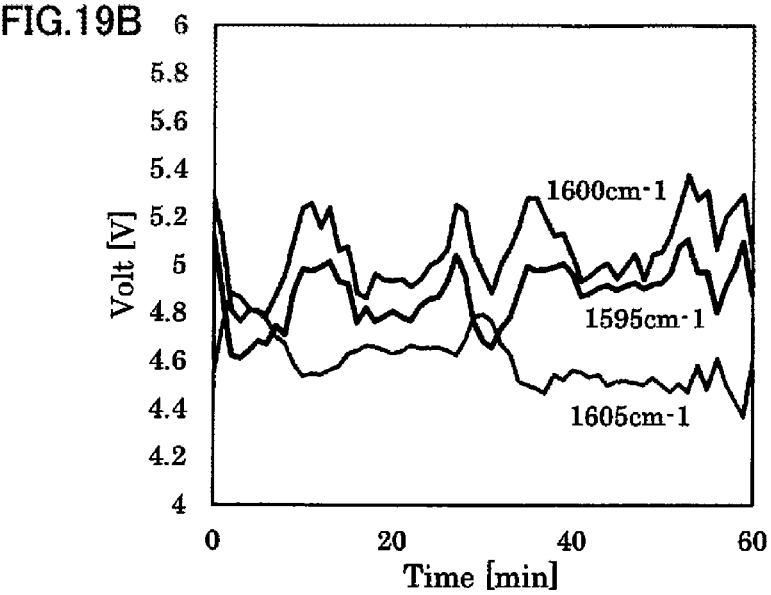

The laser light is chopped with the rotational chopper having the passing rate of 83%, is subjected to polarization modulation by the PEM 14, and detected by the detector 17. FIG. 19 illustrates a variation in intensities of the DC signal and AC signal extracted from the detected signal. Variations in the signal intensity with three swept wavenumbers (1595 $cm^{-1}$, 1600 $cm^{-1}$, 1605 $cm^{-1}$) are within an acceptable range, and an appropriate DC signal (FIG. 19A) and the AC signal (FIG. 19B) could be acquired.

Avoiding Influence of Absorption Peak of Water or Water Vapor

A means for avoiding influence of the absorption peak of water that is characteristic in the present embodiment is described. The signal processing device 40 of FIG. 7 further has: a memory portion 49 that stores known absorption peak wavenumbers of water or water vapor; a determination portion 51 that determines whether the swept wavenumber of the laser light matches with the absorption peak wavenumbers or not; and an avoidance portion 52 that avoids influence of the absorption peak when the wavenumbers are matched. The determination portion 51 and the avoidance portion 52 are incorporated to the calculation processing device 47.

As shown in FIG. 8, influence of the absorption peak of water or water vapor on the infrared CD measurement of the present embodiment is large. In a state "without purging" in particular, each absorption peak is sharp, and is detected with good sensitivity.

Therefore, the avoidance portion 52 uses the infrared CD value acquired by the laser light of the swept wavenumber before and after the absorption peak of water or water vapor, and calculates its average value as the infrared CD value in the absorption peak wavenumber of water or water vapor. As a result, noise of water or water vapor due to sharpness of detection sensitivity by the laser light of the QCL can be reduced.

A specific technique of avoiding influence of the absorption peak of water or water vapor is described.

First, ten single beams (SB) are measured, for example, and five sets of two measured beams are prepared by the apparatus of the present embodiment. By dividing one measured beam by the other measured beam of each set, five 100% lines are acquired.

Figure 20D:
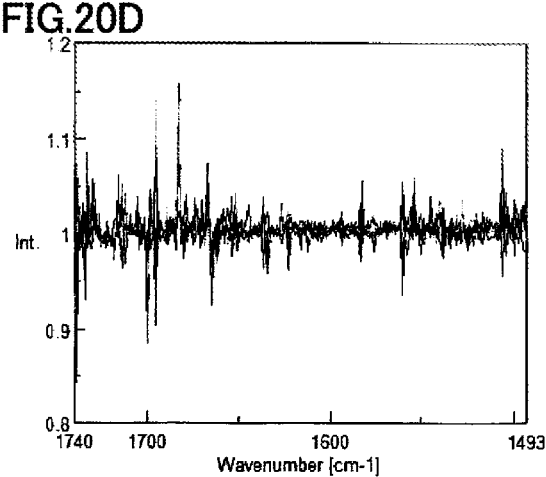

The line acquired by sweeping the wavenumber at a 0.5 $cm^{-1}$ step is illustrated in FIG. 20A. The lines of FIGS. 20B to 20D are lines of which only the intensity information for a 1.0 $cm^{-1}$ step is taken out from the line of FIG. 20A. The line of FIG. 20B is a line before the avoidance processing.

In the memory portion 49, two wavenumber sets (removal 1, removal 2) of a target of the avoidance processing shown in Table 2 are memorized in advance. These wavenumber sets contain a wavenumber information that may generate a large water vapor peak empirically. The water vapor peak in the wavenumber of Removal 1 is larger than the water vapor peak in the wavenumber of Removal 2.

TABLE 2

| | Averaged wavenumber [$cm^{-1}$] | | | | | | |
|---|---|---|---|---|---|---|---|
| Removal 1 | 1699 | 1684 | 1635 | 1617 | 1521 | 1512 | 1496 |
| Removal 2 | 1731 | 1713 | 1695 | 1558 | 1540 | 1527 | 1507 |

The determination portion 51 extracts the intensity information of the wavenumber point corresponding to the peak wavenumber of Removal 1 from the line of FIG. 20B. The avoidance portion 52 calculates an average value of the intensity information of the wavenumber points on both sides of the peak wavenumber for each of the extracted intensity information. Then, the extracted intensity information is replaced with the average value. The line after the avoidance processing for the wavenumber set of Removal 1 is illustrated in FIG. 20C.

The determination portion 51 further extracts the intensity information of the wavenumber point corresponding to the peak wavenumber of Removal 2. The avoidance portion 52 calculates an average value of the intensity information of the wavenumber points on the both sides of the peak wavenumber for each of the extracted intensity information, and replaces the extracted intensity information with the average value. The line after the avoidance processing for the wavenumber set of Removal 2 is illustrated in FIG. 20D.

By performing such avoidance processing, influence of water vapor that affects the measurement result of the infrared CD spectrum in a state without $N_2$ purging can be remarkably reduced.

Figure 21A:
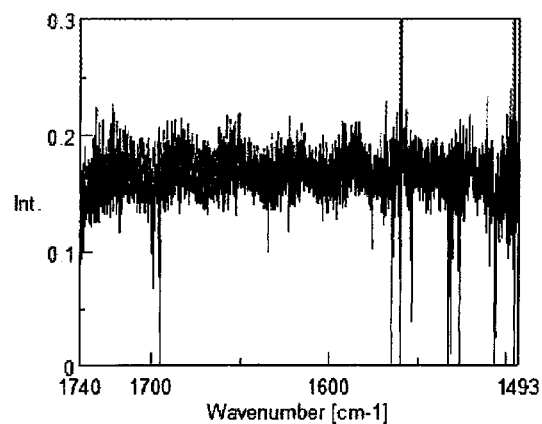
FIG. 21A to 21D illustrate AC/DC signals as a 100% line to show an effect by an absorption avoidance processing of water vapor of the present embodiment.
Figure 21B:
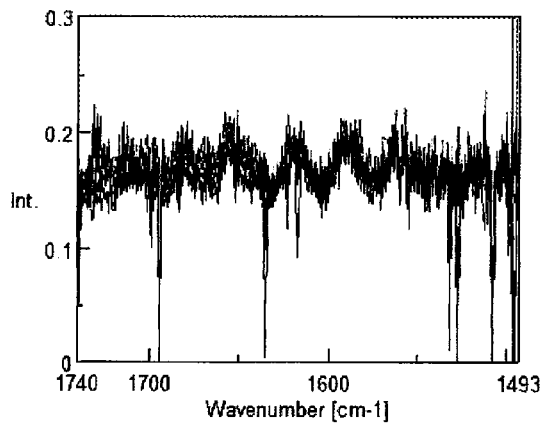
Figure 21C:
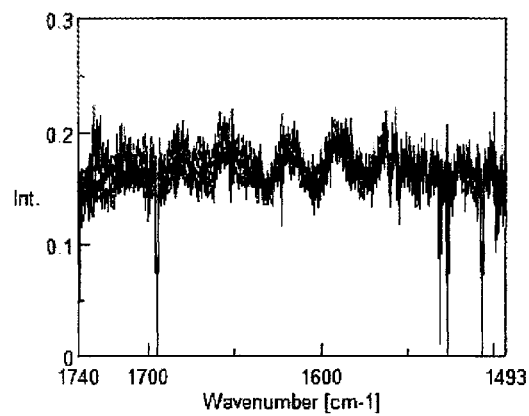
Figure 21D:
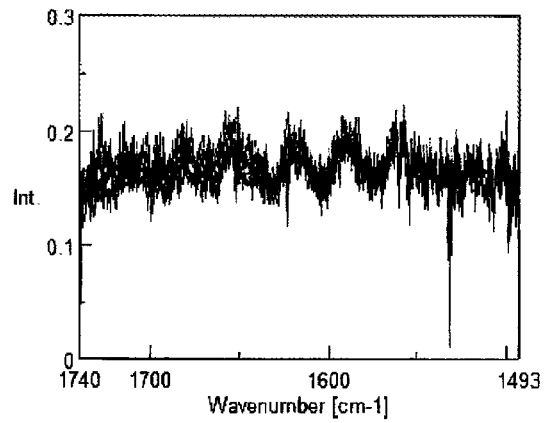

The lines of FIGS. 20A to 20D correspond to those that measured the DC signals in the present embodiment. Variations in AC/DC signals are illustrated in FIGS. 21A to 20D under the same condition. FIG. 21A illustrates the AC/DC signals acquired by sweeping the wavenumber in 0.5 cm$^{-1}$ steps. The line of FIG. 21B illustrates the AC/DC signals taken out from the line of FIG. 21A in 1.0 cm$^{-1}$ step. FIG. 21C illustrates the AC/DC signals after the avoidance processing with the wavenumber set of Removal 1. FIG. 21D illustrates the AC/DC signals which are further avoidance processed with the wavenumber set of Removal 2.

The waveform of the AC/DC signals is generally improved by executing the avoidance processing. The peak of 1531 cm$^{-1}$ in FIG. 21D is on a wavenumber point where absorption of water vapor is not so large; therefore, it is considered that the peak is caused by fluctuation of output of the QCL.

REFERENCE SIGNS LIST

10 CD measurement optical system
14 Photoelastic modulator (PEM)
15 Sample chamber
17 MCT detector
20 Fourier-transform type light source system
30 Laser light source system
32 Chopper
35 Light attenuator set (Gain switching optical element)
35a, 35b Light attenuating elements
37 Switching device
40 Signal processing device
48 Gain switching electric element
49 Memory portion
51 Determining portion
52 Avoidance portion
QCL Quantum cascade laser (Laser light source)

The invention claimed is:

1. An infrared circular dichroism measurement apparatus comprising:
   a laser light source capable of sweeping a wavenumber of a laser light in an infrared wavenumber range containing at least one absorption peak of a sample;
   a sample chamber where the sample is disposed;
   a polarization modulator that modulates a polarization state of the laser light either before or after the laser light, which is swept in a specific wavenumber, transmits the sample;
   a detector that detects a variation in intensity of the laser light which has transmitted the sample and of which its polarization state is modulated; and
   a signal processing device, including at least a processor and a memory, that is configured to:
      extract an alternating-current component (AC) that synchronizes with a modulation frequency and a direct-current component (DC) from a detected signal of the detector;
      calculate a value of infrared circular dichroism of the sample based on a ratio (AC/DC) of the AC and the DC;
      store an absorption peak wavenumber of water or water vapor;
      determine whether the swept wavenumber of the laser light matches with the absorption peak wavenumber of water or water vapor; and
      execute a processing of avoiding influence of the absorption peak when the wavenumbers match, wherein the signal processing device is further configured to calculate the infrared circular dichroism value in the absorption peak wavenumber of water or water vapor based on the infrared circular dichroism value by the laser light of the swept wavenumber before and after the absorption peak wavenumber of water or water vapor.

2. The infrared circular dichroism measurement apparatus of claim 1, wherein the laser light source is a quantum cascade laser (QCL).

3. The infrared circular dichroism measurement apparatus of claim 1,
   wherein an average output of when the laser light is emitted from the laser light source in a continuous mode at full power is 1 mW or greater, and
   an oscillation linewidth of the laser light is within a range of 0.05 to 4.0 cm$^{-1}$.

4. The infrared circular dichroism measurement apparatus of claim 1,
   wherein the signal processing device is further configured to calculate the value of infrared circular dichroism for each specific wavenumber in a wavenumber sweep to acquire an infrared circular dichroism spectrum of the sample.

5. The infrared circular dichroism measurement apparatus of claim 1, further comprising:
   a gain switching optical element disposed at any position on an optical path of the laser light, and
   a switching device that switches the gain switching optical element depending on a swept wavenumber of the laser light to adjust an amount of light entering the detector.

6. The infrared circular dichroism measurement apparatus of claim 1,
   wherein the signal processing device comprises a gain switching electric element that electrically switches intensity of an analogue signal depending on the swept wavenumber of the laser light to reduce a quantization error upon analog-to-digital conversion.

7. The infrared circular dichroism measurement apparatus of claim 1,
   wherein a chopper disposed at any position on the optical path of the laser light is comprised, and a passing rate of the laser light at the chopper is 70% or greater.

* * * * *